UNITED STATES PATENT OFFICE.

WILLIAM TENNEY CUTTER, OF HASTINGS-UPON-HUDSON, N. Y., ASSIGNOR TO THE INTERNATIONAL PAVEMENT COMPANY, OF CONNECTICUT.

PAVING-BLOCK.

SPECIFICATION forming part of Letters Patent No. 283,329, dated August 14, 1883.

Application filed April 25, 1883. (No specimens.)

*To all whom it may concern:*

Be it known that I, WILLIAM T. CUTTER, of Hastings-upon-Hudson, in the county of Westchester and State of New York, have invented a new and useful Improvement in Paving-Blocks; and I do hereby declare that the following is a full, clear, and exact description of the same.

The object I have in view is the production of paving-blocks which shall be more durable and of less cost of manufacture than those in present use; and my invention therein consists, principally, in the employment of trap, granite, and other non-calcareous stones, in contradistinction to the limestones and other calcareous stones at present employed; and, secondly, in the proportions of the several component parts which constitute the paving-block.

Hitherto the inventors of paving-blocks have apparently endeavored to produce an artificial stone like the Val de Travers, or an artificial bituminous limestone, and have attempted to bring about a more or less complete saturation of particles of crushed limestone or other calcareous stone with asphaltum or other bituminous substances. The paving-block thus prepared has no greater capacity for wear under travel than the limestone, which constitutes the greater proportion of it, and as the limestone does not resist wear very strongly such a paving-block is not sufficiently durable for heavy travel. I have discovered, however, that trap, granite, and other non-calcarous stones when crushed may be molded into paving-blocks with a smaller relative proportion of asphaltum than has been heretofore employed in the manufacture of paving-blocks, and with only sufficient to form a matrix, which holds the particles of stone mechanically without saturation of such particles in any degree, and such paving-blocks of mine will be found to have a capacity for wear under street traffic very nearly equal to blocks made simply of granite or trap, or what is known as "Belgian block," and as non-calcareous stones are commonly cheaper than calcareous stones, and as I do not employ as much asphaltum as is commonly done, I am able to produce such paving-blocks more cheaply.

In order that others may know how to make my paving-block, I will describe the preferable mode of manufacture.

Trap, granite, or other non-calcareous stone is crushed by suitable mechanism to such a degree of fineness that the resultant particles will pass through a sieve with a quarter-inch mesh. This stone, thus crushed, composed of particles of all degrees of fineness which would pass through a sieve with the mesh described, is heated in a suitable vessel to a temperature ranging from 270° to 300° Fahrenheit, and until all the water is expelled from the stone. Asphaltum is also subjected to heat in an open vessel having stirrers, at a temperature of about 300° Fahrenheit, until all its water is expelled, and when that is done there is added to the boiling asphaltum in the vessel about one-tenth part, in weight, of the mass of asphaltum originally placed in the vessel of residuum of petroleum of a gravity of about 18° Baumé, and free of water, such as is furnished by the petroleum-refineries and sold as residuum, which residuum of petroleum may be added in a cold or in a more or less heated state. The mixture of asphaltum and the residuum of petroleum is kept boiling at about the temperature of 300° Fahrenheit until there is an intimate union of the asphaltum and the residuum, which takes, commonly, about two hours.

The proportions above named are those suitable for Trinidad asphaltum; but if Cuban asphaltum is used, which has very much less water than Trinidad asphaltum, the preliminary heating of the asphaltum to expel the water will be correspondingly shortened, and to the original mass of Cuban asphaltum placed in the evaporating-vessel there should be added about one-seventh part, by weight, of the residuum of petroleum. When the asphaltum and residuum of petroleum has become intimately mixed in the same vessel, as before mentioned, and is at about the temperature of 300° Fahrenheit, and the crushed stone in its proper vessel is also at about the same temperature, they are drawn off together into a suitable mixing-vessel, preferably jacketed or otherwise adapted to retain the heat, and thoroughly and intimately mixed together in the proportions, by weight, of about seven-eighths of the stone to one-eighth of the asphaltum mixture, and when thus thoroughly and intimately mixed the contents of the mixing-vessel is discharged regularly and in proper quantities into a suitable machine, where it is compressed into blocks of a convenient size for paving purposes. The result of this mode of manufacture is that the particles of stone are held mechanically by the asphaltum mixture, which does not penetrate the particles of the stone, as is stated to be the case in patents describing paving-blocks made of limestone or other calcareous stone.

I am aware of the inventions described in Letters Patent granted to E. J. De Smedt, May 31, 1870, No. 103,582, and in the reissue of the same dated July 27, 1880, No. 9,325, and the invention described in Letters Patent granted to A. Van Camp, March 14, 1876, No. 174,648, and disclaim the invention described in either of such patents, inasmuch as my paving-blocks differ in composition and in mode of preparation and in proportion of parts from either of the street-pavements described in these patents. Neither do I pretend to have been the original inventor of paving-blocks resembling Val de Travers stone, or of paving-blocks made of limestone and other calcareous stones and asphaltum and coal-tar.

I am also aware that almost every variety of stone has been used simply or in compounds for asphalt and concrete street-pavements; but I do not know or believe that prior to my invention any paving-blocks have been made simply of crushed trap, granite, or other non-calcareous stone with a mechanically-binding mixture of asphaltum and the residuum of petroleum, substantially as I have above described.

What I claim, therefore, as my invention, and desire to protect by Letters Patent, is—

Paving-blocks compounded of crushed trap, granite, or other non-calcareous stone and a mixture of asphalt and the residuum of petroleum, in the manner and in the proportions substantially as described.

In testimony whereof I affix my signature in presence of two witnesses.

WILLIAM TENNEY CUTTER.

Witnesses:
GEO. H. COOPER, Jr.,
E. J. SWEET.